(12) United States Patent
Peterson et al.

(10) Patent No.: US 9,432,453 B2
(45) Date of Patent: Aug. 30, 2016

(54) SYSTEM AND METHOD FOR SHARING GEOSPATIAL ASSETS BETWEEN LOCAL DEVICES

(75) Inventors: Bret E. Peterson, Lafayette, CA (US); Eli Dylan Lorimer, San Francisco, CA (US); Stephen Joseph Potell, Vienna, VA (US)

(73) Assignee: Google Inc., Mountain View, CA (US)

( * ) Notice: Subject to any disclaimer, the term of this patent is extended or adjusted under 35 U.S.C. 154(b) by 488 days.

(21) Appl. No.: 13/483,215

(22) Filed: May 30, 2012

(65) Prior Publication Data

US 2013/0325920 A1    Dec. 5, 2013

(51) Int. Cl.
*G06F 15/16* (2006.01)
*H04L 29/08* (2006.01)
*G06F 12/00* (2006.01)

(52) U.S. Cl.
CPC ..... *H04L 67/1068* (2013.01); *H04L 29/08072* (2013.01); *H04L 67/104* (2013.01); *H04L 67/1093* (2013.01)

(58) Field of Classification Search
CPC .................................................. G06F 15/16
USPC ........................................................ 709/203
See application file for complete search history.

(56) References Cited

U.S. PATENT DOCUMENTS

| | | | |
|---|---|---|---|
| 7,426,730 B2* | 9/2008 | Mathews et al. | 718/104 |
| 7,450,003 B2* | 11/2008 | Weber et al. | 340/539.2 |
| 7,933,929 B1* | 4/2011 | McClendon | G06F 3/04815 707/802 |
| 8,068,849 B2* | 11/2011 | Manson et al. | 455/456.1 |
| 8,713,032 B2* | 4/2014 | Wheeler et al. | 707/756 |
| 8,739,123 B2* | 5/2014 | Appleton et al. | 717/120 |
| 2006/0242111 A1 | 10/2006 | Goldstein | |
| 2007/0180131 A1 | 8/2007 | Goldstein et al. | |
| 2008/0208962 A1* | 8/2008 | Kim et al. | 709/203 |
| 2008/0307498 A1* | 12/2008 | Johnson et al. | 726/3 |
| 2011/0205229 A1 | 8/2011 | Jagadev et al. | |
| 2011/0275388 A1 | 11/2011 | Haney | |
| 2012/0038633 A1 | 2/2012 | Clark et al. | |
| 2013/0218890 A1* | 8/2013 | Fernandes et al. | 707/736 |
| 2013/0238599 A1 | 9/2013 | Burris | |

OTHER PUBLICATIONS

NPL1: (Title: Interactive Mobile 3D Graphics for on-the-go Visualization and Walkthroughs; article in SAC'06, Apr. 23-27, 2006,by Rodrigues et al).*
International Search Report—2 pages.

* cited by examiner

*Primary Examiner* — Zarni Maung
(74) *Attorney, Agent, or Firm* — Dority & Manning, P.A.

(57) ABSTRACT

A system and method for sharing geospatial assets between local devices is disclosed. In one embodiment, the method may generally include storing a geospatial asset on a first local device. The first local device may include a processor and memory storing instructions that, when executed by the processor, configures the first local device to act as a local server. The method may also include transmitting with the local server data indicating the availability of the geospatial asset to be shared, receiving from a second local device a request to share the geospatial asset and sharing the geospatial asset with the second local device.

20 Claims, 3 Drawing Sheets

SYSTEM AND METHOD FOR SHARING GEOSPATIAL ASSETS BETWEEN LOCAL DEVICES

FIELD

The present subject matter relates generally to a system and method for sharing geospatial assets and, more particularly, to a system and method for sharing geospatial assets, such as 3-D globes, 2-D maps and geospatial search data, between local computing devices.

BACKGROUND

Geographic Information Systems (GIS) clients capture, store, manage and display data elements according to geospatial coordinates. For example, mapping clients, such as Google Maps, render maps, satellite imagery and other data over a two-dimensional surface. Similarly, earth-browsing clients, such as Google Earth, render satellite imagery, terrain, vectors and other data over a three-dimensional geometry representing the Earth's surface. Thus, a user of Google Maps or Google Earth may navigate across the two-dimensional surface or three-dimensional geometry while data and images corresponding to geographical locations are presented to the user.

To provide for such a user experience, an enormous amount of geospatial data must be organized and indexed into geospatial assets, such as 2-D maps or 3-D globes. Typically, users rely on access to central or master servers to provide this geospatial data to their mapping or earth-browsing clients. However, it is often the case that access to such master servers is not available, thereby limiting or preventing a user from retrieving the desired geospatial data.

SUMMARY

Aspects and advantages of the invention will be set forth in part in the following description, or may be obvious from the description, or may be learned through practice of the invention.

In one aspect, the present subject matter is directed to a method for sharing geospatial assets between local devices. The method may generally include storing a geospatial asset on a first local device. The first local device may include a processor and memory storing instructions that, when executed by the processor, configures the first local device to act as a local server. The method may also include transmitting with the first local device data indicating the availability of the geospatial asset to be shared, receiving from the second local device a request to share the geospatial asset and sharing the geospatial asset with the second local device.

In another aspect, the present subject matter is directed to a system for sharing geospatial asset between local devices. The system may generally include a computing device having a processor and memory. The memory may store instructions that, when implemented by the processor, configure the computing device to act as a local server. The local server may be configured to transmit data indicating the availability of a geospatial asset to be shared. In addition, the local server may also be configured to both receive a request from a second local device to share the geospatial asset and share the geospatial asset with the second local device.

In a further aspect, the present subject matter is directed to a method for sharing geospatial assets between local devices. The method may generally include receiving with a first local device data indicating the availability of a geospatial asset to be shared. The geospatial asset may be stored on a second local device. In addition, the method may include transmitting a request to the second local device to share the geospatial asset and receiving access to the geospatial asset from the second local device.

Other exemplary aspects of the present subject matter are directed to apparatus, computer-readable media, devices and other systems and/or methods for sharing geospatial assets between local devices.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
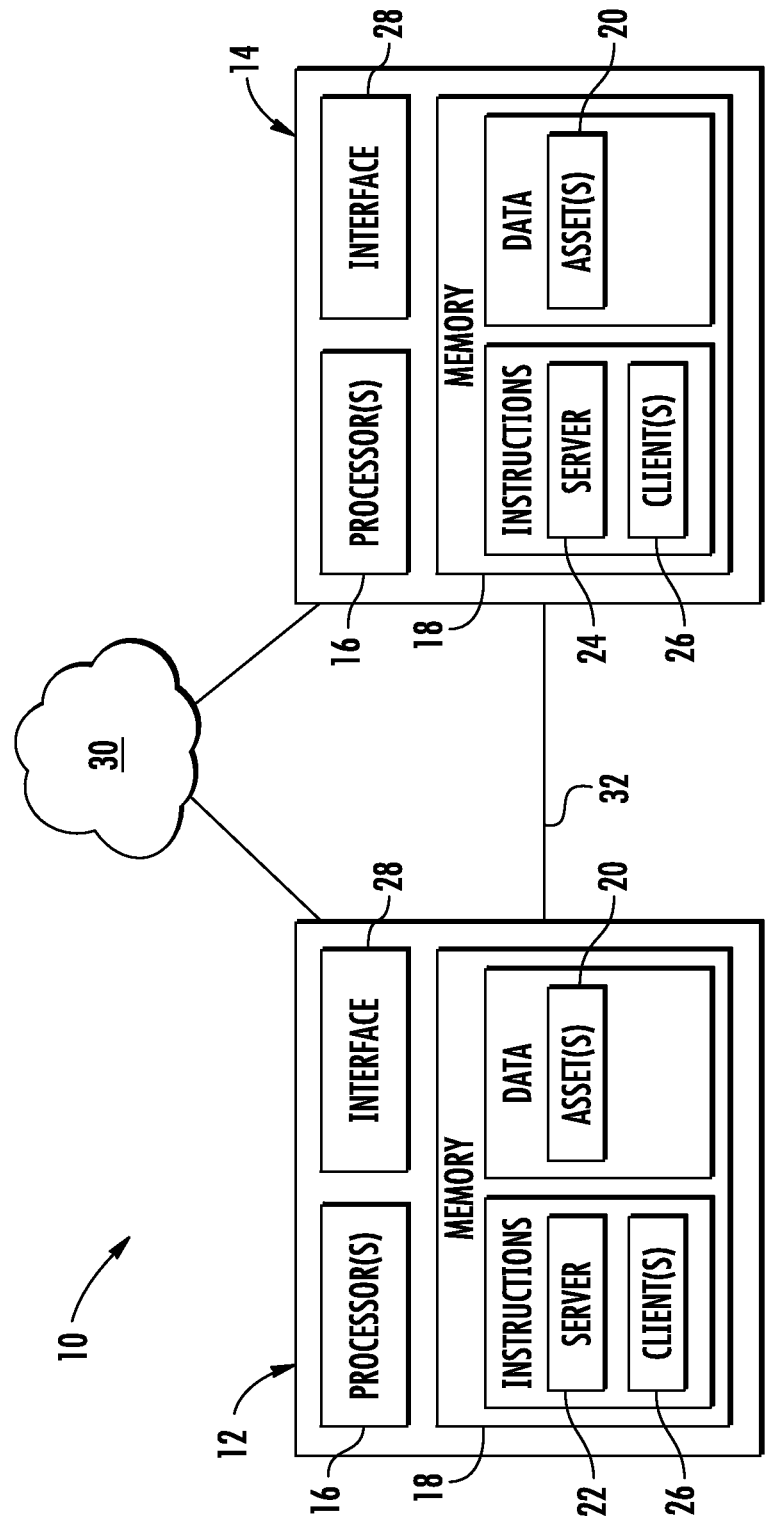
FIG. 1 illustrates a schematic view of one embodiment of a system for sharing geospatial assets between local devices.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for sharing geospatial assets between local computing devices. Specifically, in several embodiments, a local computing device may include suitable computer-readable instructions, that when implemented, configure the device to function as a local server. The local server may generally be configured to share geospatial assets stored on the local computing device with other local computing devices. For example, the local server may be configured to register itself as a provider of geospatial assets on a local network. Geographic Information Systems (GIS) clients running on other local computing devices that are connected to the same network may then discover the local server and query it for what geospatial assets are available to be shared. For example, a local computing device running an earth-browsing client (e.g., Google Earth or any other suitable client application that allows browsing of a three-dimensional model of the earth) and/or a mapping client (e.g., Google Maps or any other suitable mapping application) may request a list of the 3-D globes and/or 2-D maps that are available from the local server. Once such information is received, the client may then transmit an intent or request asking the local server to share a particular geospatial asset. For example, the client may request that the geospatial asset be transferred or downloaded from the local server to the client device or that the local server serve the geospatial asset on the client over the local network.

As will be apparent from the description provided herein, the disclosed subject matter may generally allow for geospatial assets to be quickly and easily shared between local computing devices. For example, a user of a local computing device may be provided various options for discovering and/or accessing geospatial assets stored on another local device, such as by polling a local network for other devices capable of sharing geospatial assets, by directly downloading geospatial assets from other local devices and/or by being served the geospatial assets directly from other local devices. As such, the user may be capable for accessing and/or receiving geospatial assets without the necessity of connecting to a central or master server.

As used herein, the term "geospatial asset" generally refers to any data that may be rendered or otherwise used by a GIS client, such as 2-D maps, 3-D globes, geospatial search data, updates to existing geospatial data and/or the like. In addition, the term "geospatial asset" may also include a GIS client, itself, such as an earth-browsing client or a mapping client or any other suitable client configured to utilize geospatial data. As is generally understood, a 2-D map may correspond to geospatial data that has been organized and indexed such that the data may be rendered over a two-dimensional surface. Similarly, a 3-D globe may generally correspond to geospatial data that has been organized and indexed such that the data may be rendered over a three-dimensional geometry representing the Earth's surface. For example, in one embodiment, a 3-D globe may be a directory hierarchy containing a number of packet bundles or files that may be used to serve imagery, terrain and vectors to an earth-browsing client. In such an embodiment, the 3-D globe may be a master globe including imagery, terrain and vector data or a regional globe including a smaller subset of the imagery, terrain and vector data forming the master globe. For instance, it should be appreciated that specific imagery, terrain and vector data (corresponding to, for example, a specific geographical region(s) of a 3-D globe) may be selected from one 3-D globe and organized/indexed to form a different 3-D globe. Similarly, smaller subsets of the data forming a particular 2-D map may also be selected and organized/indexed to form a different 2-D map.

Referring now to FIG. 1, a schematic view of one embodiment of a system 10 for sharing geospatial assets between local devices is illustrated in accordance with aspects of the present subject matter. As shown, the system 10 may generally include a first local device 12 and a second local device 14. In general, the first and second local devices 12, 14 may be processor-based computing devices. For example, in several embodiments, the first and second local devices 12, 14 may be portable computing devices, such as mobile phones (including smart phones), personal digital assistants, tablets, laptops and/or the like. However, in other embodiments, the first and second local devices 12, 14 may be any other suitable computing devices, such as workstations, game consoles, other computers and/or the like.

As shown in FIG. 1, each local device 12, 14 may generally include one or more processors 16 and associated memory 18. The processor(s) 16 may generally be any suitable processing device known in the art. Similarly, the memory 18 may generally be any suitable computer-readable medium or media including, but not limited to, RAM, ROM, hard drives, flash drives or other memory devices. As is generally understood, the memory 18 may be configured to store various types of information, such as data that may be accessed by the processor(s) and instructions that may be executed by the processor(s). The data stored within the memory 18 of each local device 12, 14 may generally correspond to any suitable files or other data that may be retrieved, manipulated and stored by the processor(s) 16. In several embodiments, the data may include one or more types of geospatial assets 20. For example, as shown in FIG. 1, the first local device 12 may include one or more geospatial assets 20, such as one or more 3-D globes, 2-D maps and/or sets of geospatial search data, stored within its memory 18. Similarly, the second local device 14 may include one or more geospatial assets 20, such one or more 3-D globes, 2-D maps and/or sets of geospatial search data, stored within its memory 18.

It should be appreciated that the geospatial assets 20 may be transferred to and stored within the local devices 12, 14 using any suitable means and/or process known in the art. For instance, in several embodiments, the geospatial assets 20 may be transmitted or downloaded onto the memory 18 of the local devices 12, 14 from a central or master server (via a suitable network). For example, U.S. Pat. Pub. 2011/0205229 (Jagadev et al.), filed on Feb. 23, 2010 and entitled "Portable Globe Creation For a Geographical Information System," the disclosure of which is hereby incorporated by reference herein for all purposes, discloses a system and method for transferring 3-D globes from a master server to a local device. A similar system and method may also be used to transfer other geospatial assets, such as 2-D maps and geospatial search data, from a master server to a local device. In other embodiments, the geospatial assets 20 may be transferred to the local devices 12, 14 from any another other suitable computing devices and/or storage device. For instance, as will be described below, geospatial assets 20 may be transferred directly between the local devices 12, 14. For purposes of this disclosure, a geospatial asset 20 is stored on a local device if the geospatial asset forms all or part of cached data received from a separate server accessible to the local device (e.g., a server associated with a cloud network).

Referring still to FIG. 1, the instructions stored within the memory 18 of the local devices 12, 14 may generally be any set of instructions that, when executed by the processor(s) 16, cause the processor(s) 16 to provide desired functionality. For example, the instructions may be software instructions rendered in a computer readable form or the instructions may be implemented using hard-wired logic or other circuitry. In several embodiments, suitable instructions may be stored within the memory 18 that, when implemented by the processor(s) 16, configure the local devices 12, 14 to act as local servers 22, 24. For example, as shown in FIG. 1, the first local device 12 may include suitable instructions that configure the device 12 to serve as a first local server 22. Similarly, the second local device 14 may include suitable instructions that configure the device 14 to serve as a second local server 24.

The local servers 22, 24 may generally be configured to execute or provide computer-readable instructions or data for use with GIS clients 26 stored on the local devices 12, 14, such as earth-browsing clients and mapping clients, that are designed to render and/or serve geospatial assets 20. Specifically, in several embodiments, each local server 22, 24 may be configured to register itself as a provider of the geospatial assets 20 stored within the memory 18 of the server's respective local device 12, 14. Clients 26 may then discover the local server 22, 24 in order to obtain information regarding what geospatial assets 20 are available on the local device 12, 14 and/or to gain access to such assets 20. For example, in one embodiment, the local servers 22, 24 may be local host servers and, thus, may only be configured to serve clients 26 running on the same local device 12, 14. In other embodiments, each local server 22, 24 may be configured to share geospatial assets 20 with other local devices. For example, as will be described in greater detail below, the local servers 22, 24 may be configured to transfer geospatial assets 20 to another local device and/or serve geospatial assets 20 on a GIS client of another local device.

It should be appreciated that each local device 12, 14 may be configured to provide a user of such device 12, 14 the option of whether to share geospatial assets 20 with other local device(s). For example, the user of each device 12, 14 may have the option to share geospatial assets 20 locally within the device, to share geospatial assets 20 with other devices via a protected scheme (e.g., password protected, encrypted data and/or the like) or to share geospatial assets 20 with other devices without any protected scheme. In such an embodiment, user interface elements may be utilized to identify to the user which sharing mode is currently selected (i.e., local sharing, protected sharing with other devices or open sharing with other devices).

Additionally, as shown in FIG. 1, each local device 12, 14 may also include a network interface 28 for accessing and/or sharing information over a network 30. The network interface 28 may generally include various communications devices and/or modules to facilitate the transfer and receipt of information using one or more suitable communication protocols. For instance, in one embodiment, the network interface 28 may include one or more antennas, RF devices, wireless network devices and/or the like, to facilitate wireless communications via a suitable wireless communication protocol.

As indicated above, in several embodiments, the local devices 12, 14 may be configured as portable computing devices. Thus, it should be appreciated that the network 30 may, in several embodiments, be a wireless network, such as a cellular network, WiFi network, device-to-device network (e.g., using Bluetooth or Near Field Communication (NFC) protocols), device-originated network (e.g., a mobile hot spot) and/or the like, to facilitate wireless communications between the local devices 12, 14. However, in other embodiments, the local devices 12, 14 may be configured to be communicatively coupled to one another via a direct communicative link, such as a USB cable or other suitable cable, to allow for the transfer of data between the devices 12, 14.

Figure 2:
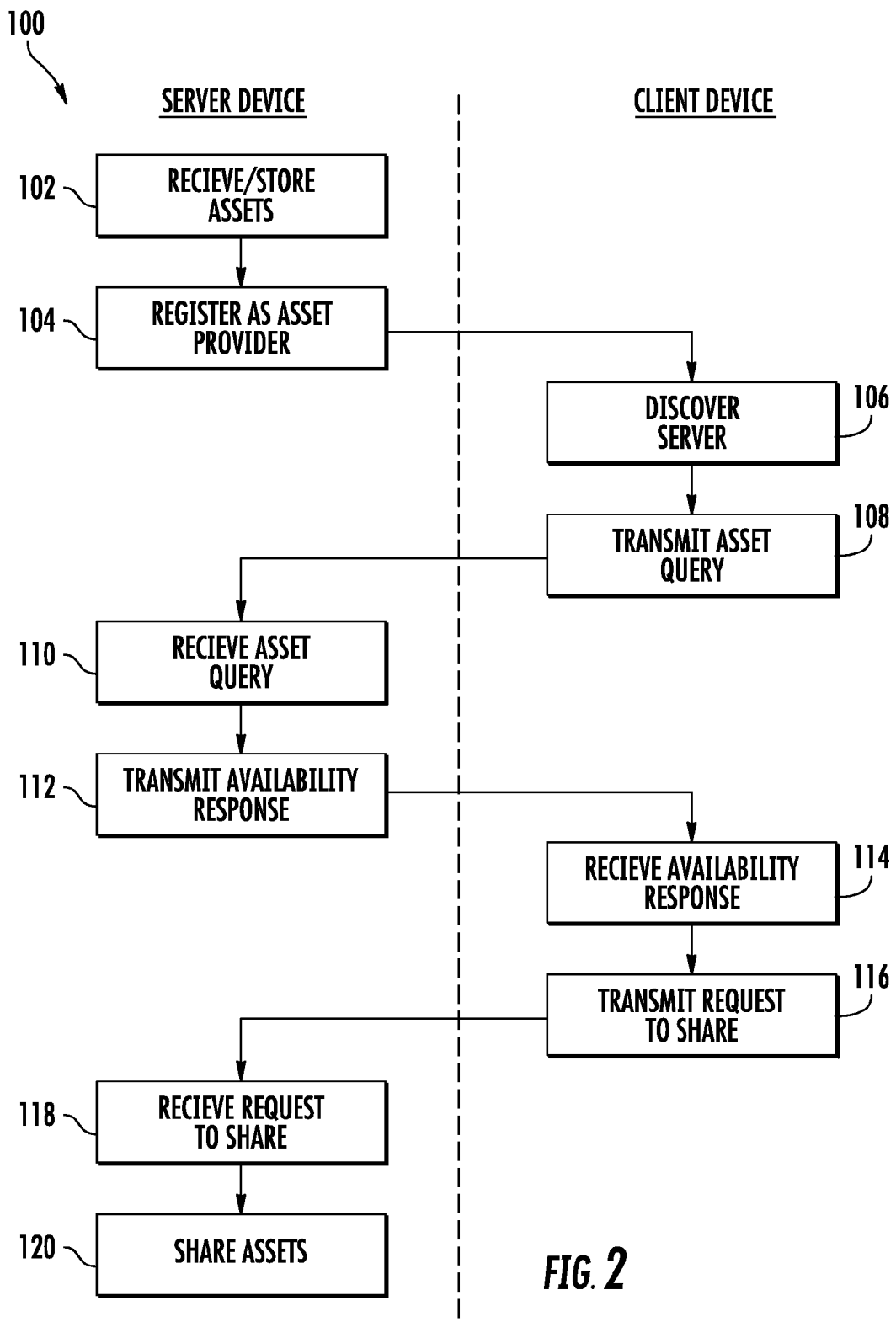
FIG. 2 illustrates a server-client flow diagram of one embodiment of a method for sharing assets between local devices.

Referring now to FIG. 2, a client-server flow diagram of one embodiment of a method 100 for sharing geospatial assets between local devices is illustrated in accordance with aspects of the present subject matter. In general, the disclosed method 100 will be described below with reference to sharing geospatial assets stored on a server device (e.g., the first local device 12) with a client device (e.g., the second local device). However, it should be readily appreciated by those of ordinary skill in the art that the subject matter of the disclosed method 100 may also be carried out on a single local device to permit geospatial assets to be served on clients running on such device.

As shown in FIG. 2, one or more geospatial assets may be initially received by and/or stored onto the server device (102). For example, as indicated above, the geospatial asset(s) may be transmitted to the server device from a central or master server and subsequently stored on the device's memory. Alternatively, the geospatial asset(s) may be transmitted to the server device from any other computing device and/or storage device and subsequently stored on the server device, such as by transmitting the geospatial asset(s) to the server device from a local device connected to the same network. Regardless, by maintaining one or more geospatial assets in local storage, the server device may be equipped to share the geospatial asset(s) by acting as a local server (e.g., the first local server 22). Specifically, in several embodiments, the local server may be configured to register itself as a provider of the geospatial asset(s) stored on the server device (104). For example, the local server may broadcast data over a network (e.g., a local wireless network, such as a WiFi network or a device-to-device network) indicating that it has geospatial assets available to be shared.

By registering itself as a provider of geospatial assets over a network, the local server may be discovered by one or more client devices connected to the same network (106). For example, the client device may be configured to both receive the registration data broadcast over the network and recognize the local server as a provider of geospatial assets. The client device may then query the local server to determine what geospatial assets are available to be shared (108). For example, an earth-browsing client running on the client device may transmit a request to the local server to provide a list of any 3-D globes and/or associated geospatial search data that are available to be shared by the server. Similarly, a mapping client running on the client device may transmit a request to the local server to provide a list of any 2-D maps and/or associated geospatial search data that are available to be shared by the server.

It should be appreciated that, in alternative embodiments, the client device may be configured to discover the local server by polling the network for servers capable of providing geospatial assets. In such embodiments, the local server may be configured to transmit a response to the polling inquiry indicating that it is a provider of one or more geospatial assets.

Referring still to FIG. 2, the local server may be configured to receive the asset query transmitted from the client device (110) and may thereafter transmit a response providing data related to the geospatial asset(s) available to be shared (112). Specifically, in several embodiments, the local server may be configured to transmit a description of the particular geospatial asset(s) stored on the server device that may rendered by a corresponding GIS client of the client device. For example, in response to an asset query from an earth-browsing client, the local server may transmit a description of every 3-D globe that is available to be shared. The description may simply be a list of the geospatial assets available to be shared or may include specific information related to the available geospatial assets, such as information related to the specific geographic region covered by the geospatial asset(s), the file size of the geospatial asset(s) and/or the like. In addition, the local server may be configured to transmit data in response to the asset query indicating how the geospatial assets are available to be shared. For example, the local server may transmit data indicating that certain geospatial assets are available to be downloaded from the server device 14 and/or that certain geospatial assets are being served by the local server at a specific location (e.g., at a specific server address).

It should be appreciated that the data related to the geospatial asset(s) available to be shared may generally be transmitted from the local server to the client device using any suitable communication transfer technology. For example, in one embodiment, the data may be transmitted by the local server using Quick Response (QR) codes or NFC technology.

Additionally, as shown in FIG. 2, the client device may be configured to receive the availability response from the local server (114) and transmit a response requesting that the local server share one or more selected geospatial assets with the client device (116). For example, upon receiving the availability response, the client device may be configured to display the data transmitted from the local server to a user of the client device, such as by generating a list or other display window that displays the data related the geospatial assets available to be shared. The user may then provide an input selecting the desired geospatial asset(s) from the list or other display window, which may cause the client device to transmit a request to the local server to share the selected geospatial asset(s). For instance, if the selected geospatial asset(s) are desired to be downloaded from the server device, the client device may be configured to transmit a request to transfer the geospatial asset(s) from the server device to the client device. Alternatively, if the selected geospatial asset(s) are being served by the local server at a specific location, the client device may be configured to transmit a request for the local server to serve the geospatial asset(s) on the appropriate GIS client of the client device. For example, if a 3-D globe is being served by the local server at a particular address, an earth-browsing client of the client device may transmit a request to the server address instructing the local server to serve the 3-D globe on the client.

It should be appreciated that, as an alternative to transmitting an availability response (112) in response to an asset query from the client device (108), the local server may be configured to continuously broadcast data related to the geospatial asset(s) available to be shared. In such an embodiment, upon discovering the local server, the client device may have immediate access to information related to the geospatial asset(s) stored on the server device. A user of the client device may then select one or more of the available geospatial assets, thereby causing the client device to transmit a request to the local server to share the selected geospatial asset(s).

Moreover, as shown in FIG. 2, the local server may be configured to receive the request to share from the client device (118) and may subsequently share the selected geospatial asset(s) with the client device (120). For example, if one or more geospatial assets are to be transferred from the server device to the client device, the local server may be configured to provide the geospatial asset(s) in a suitable format to enable the client device to download such asset(s) from the server device, such as by allowing the assets to be specified via QR codes, NFC, manual entry and/or the like. Similarly, if one or more geospatial assets are to be served on a suitable GIS client of the client device, the local server may allow for the GIS client to connect to the server over the available network (e.g., a local WiFi network or a device-to-device network).

Figure 3:
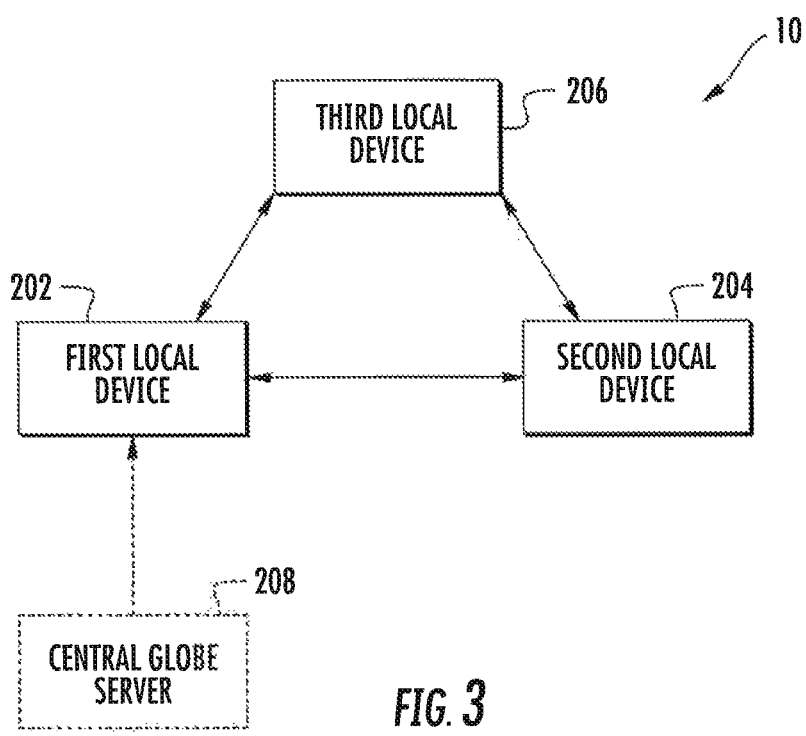
FIG. 3 illustrates a schematic view of another embodiment of a system for sharing geospatial assets between local devices.

It should be appreciated that, although the present subject matter has generally been described with reference to sharing geospatial assets between two local devices, any number of local devices may be utilized alone or combination to facilitate sharing of geospatial assets. For example, FIG. 3 illustrates a simplified, schematic view of another embodiment of a system 10 for sharing geospatial assets between local devices. As shown, the system 10 includes a first local device 202, a second local device 204 and a third local device 206, with each local device 202, 204, 206 generally be configured the same as or similar to the local devices 12, 14 described above with reference to FIG. 1.

As indicated above with reference to FIGS. 1 and 2, the local devices 202, 204, 206 may be configured to share geospatial assets with one another. Additionally, in one embodiment, each local device 202, 204, 206 may be configured to act as proxy server for sharing geospatial assets between other local devices. For example, referring to FIG. 3, when geospatial assets are being shared between the first and second local devices 202, 204, the third local device 206 may act as an intermediary for the various requests, responses and/or other data being transmitted between the first and second local devices 202, 204. Such use of intermediary devices may generally extend the potential range for sharing geospatial assets between devices, including allowing geospatial assets to be shared across multiple networks.

Moreover, in one embodiment, each local device 202, 204, 206 may be configured to act as a registry of the geospatial assets that are available to be shared from multiple devices. For example, assuming that the first local device 202 has specific geospatial assets to be shared, the first local device 202 may register itself as a provider of such assets with another device, such as the second local device 204. The second local device 204 may then broadcast data over a network identifying the first local device 202 as a provider of specific geospatial assets. In addition, clients running on other local devices (e.g., the third local device 206) may query the first local device 202 or the second local device 204 to determine what assets are available to be shared. In the event such query is transmitted to the second local device 204 (i.e., the registry device), the device may be configured to provide both information regarding what assets are available to be shared and information regarding how such assets may be accessed via the first local device 202.

Further, in another embodiment of the present subject matter, the geospatial data used to construct a particular geospatial asset, such as a 3-D globe or a 2-D map, may be derived from multiple devices. For example, when rendering a 3-D globe on the first local device 202, one or more layers of the 3-D globe may be served by the second local device 204 while one or more other layers of the 3-D globe may be served by the third local device 206. Similarly, one or more layers of the 3-D globe may be served by a local device (e.g., the second local device 202 or the third local device 204) while one or more other layers (e.g., a base layer) may be served by another computing device, such as central globe server 208 (shown in dashed lines).

Additionally, when specific geospatial assets are to be shared among multiple devices, one of the local devices 202, 204, 206 may be designated as the master server and may be configured to serve such assets on various slave applications running on other local devices. For example, if a user of the first local device 202 is currently viewing a particular 3-D globe and the local server of the first local device 202 is designated as the master server, earth-browsing clients on the second and third local devices 204, 205 may connect to the first local device 202 to allow the 3-D globe to be viewed by users of the second and third local devices 204, 206 at the same altitude, latitude, longitude, angle, settings, etc. as that displayed on the first local device 202. In such an embodiment, the slave applications may simply connect to the master server to gain access to the 3-D globe or the slave applications may run the server locally (assuming that the 3-D globe has already been downloaded to the devices running the slave applications). Regardless, the designation of one of the local devices 202, 204, 206 as the master server may permit such device to share driving routes and other data, such as cursor positions, comments and/or the like, simultaneously with multiple devices. In addition, the designation of master server may be transferrable to other local devices, thereby allowing users of other devices to control the content of what is displayed in connection with the shared geospatial assets. Further, the designation of a master server may provide for a sync mode between the local devices 202, 304, 206, whereby a client on the master device may sync its current view of a particular geospatial asset with clients running on other slave devices. In such an embodiment, if users of the clients running on the slave devices choose to view other aspects of the same geospatial asset or to view completely different geospatial assets, the users may be provided with the option of later syncing back to the master view.

Moreover, in one embodiment, the local devices 202, 204, 026 may be configured to allow for automated switching of the geospatial assets being served. For example, if the first local device 202 is serving a particular 3-D globe on the second and third local devices 204, 206, the devices 202, 204, 206 may be configured such that, when the first local device 202 begins serving another 3-D globe, this new 3-D globe may be automatically rendered on the second and third local devices 204, 206. Such automated switching may allow, for example, for the server device to provide updated geospatial assets without requiring any input from the client device(s). Alternatively, the local devices 202, 204, 206 may be configured to display a notification (e.g., in a message window) when a new or updated geospatial asset(s) is available to be shared. In such an embodiment, a user of such device(s) 202, 204, 206 may then decide whether to switch to the newly available geospatial asset(s).

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for sharing geospatial assets between local devices, the method comprising:
   receiving, with a first local device, a first geospatial asset from a remote master geographic information systems (GIS) server, the first geospatial asset comprising at least one of a 2-D map or a 3-D globe that corresponds to a data subset of at least one master geospatial asset stored on the remote master GIS server;
   storing the first geospatial asset on the first local device, the first local device including a processor and memory storing instructions that, when executed by the processor, configure the first local device to act as a local server;
   receiving, with the local server, an indication from a second local device that a second geospatial asset is available to be shared over a local wireless network, the second geospatial asset differing from the first geospatial asset;
   broadcasting, with the local server, data over the local wireless network indicating the availability of the first and second geospatial assets to be shared by at least one of the local server or the second local device;
   receiving, with the local server, a request from a third local device to share the first geospatial asset;
   sharing, with the local server, the first-geospatial asset with the third local device over the local wireless network; and
   transmitting, with the local server, data associated with a current view of the first geospatial asset provided within a client executed by the local server such that a view of the first geospatial asset provided within a corresponding client executed by the third local device is synced to the current view associated with the local server.

2. The method of claim 1, wherein broadcasting data over the local wireless network indicating the availability of the first and second geospatial assets to be shared comprises broadcasting descriptions of the first and second geospatial assets.

3. The method of claim 1, wherein broadcasting data over the local wireless network indicating the availability of the first and second geospatial assets to be shared comprises broadcasting data associated with accessing the second geospatial asset via the second local device.

4. The method of claim 1, wherein receiving the request from the third local device to share the first geospatial asset comprises a receiving a request to transfer the first geospatial asset from the first local device to the third local device.

5. The method of claim 1, wherein receiving the request from the third local device to share the first geospatial asset comprises receiving a request to serve the first geospatial asset to a client of the third local device.

6. The method of claim 1, wherein sharing the first geospatial asset comprises transferring the first geospatial asset from the first local device to the third local device.

7. The method of claim 1, wherein sharing the first geospatial asset comprises serving, with the local server, the first geospatial asset to a client of the third local device.

8. The method of claim 1, further comprising receiving, with the local server, an asset query from the third local device regarding what geospatial assets are available to be shared over the local wireless network by at least one of the local server or one or more of a plurality of local devices connected to the local wireless network.

9. The method of claim 1, wherein sharing the first geospatial asset with the third local device comprises sharing the first geospatial asset with the third local device through another local device acting as a proxy server.

10. The method of claim 1, further comprising:
    sharing, with the local server, the first geospatial asset with the plurality of local devices connected to the local wireless network; and
    transmitting, with the local server, data associated with the current view of the first geospatial asset provided within the client executed by the local server such that a view of the first geospatial asset provided within a corresponding client executed by each of the plurality of local devices is synced to the current view associated with the local server.

11. The method of claim 1, wherein the view of the first geospatial asset provided within the corresponding client executed by the third local device is limited to the current view of the first geospatial asset provided within the client executed by the local server.

12. The method of claim 1, wherein the local wireless network corresponds to at least one of a WiFi network, a device-to-device network or a device-originated network.

13. A system for sharing geospatial assets between local devices, the system comprising:
a computing device including a processor and memory storing instructions that, when implemented by the processor, configure the computing device to act as a master local server for a plurality of local devices connected to a local wireless network, the master local server being configured to:
receive a first geospatial asset from a remote master geographic information systems (GIS) server, the first geospatial asset comprising at least one of a 2-D map or a 3-D globe that corresponds to a data subset of at least one master geospatial asset stored on the remote master GIS server
receive an indication from a second local device of the plurality of local devices that a second geospatial asset is available to be shared over the local wireless network, the second geospatial asset differing from the first geospatial asset;
broadcast data over the local wireless network indicating the availability of the first and second geospatial assets to be shared by at least one of the master local server or the second local device;
receive a request from a third computing device to share the first geospatial asset;
share the first geospatial asset with the third computing device over the local wireless network;
transmit data associated with a current view of the first geospatial asset provided within a client executed by the computing device such that a view of the first geospatial asset provided within a corresponding client executed by the third computing device is synced to the current view associated with the computing device.

14. The system of claim 13, wherein the broadcasted data comprises at least one of descriptions of the first and second geospatial assets or one or more locations at which the first and second geospatial assets are being served by the at least one of the master local server or the second local device.

15. The system of claim 13, wherein the master local server is configured share the first geospatial asset by transferring the first geospatial asset from the computing device to the third computing device.

16. The system of claim 13, wherein the master local server is configured to share the first geospatial asset by serving the first geospatial asset to the client of the third computing device.

17. The system of claim 16, wherein the clients of the master local server and the third computing device correspond to GIS clients.

18. The system of claim 13, wherein the first and second computing devices comprise portable computing devices.

19. The system of claim 13, wherein the local wireless network corresponds to at least one of a WiFi network, a device-to-device network or a device-originated network.

20. The method of claim 1, wherein the local server is designated as a master local server for a plurality of local devices connected to the local wireless network.

* * * * *